United States Patent [19]

Strohmer

[11] Patent Number: 5,579,513
[45] Date of Patent: Nov. 26, 1996

[54] METHOD FOR MONITORING THE SYNCHRONIZATION OF CLOCKS IN COMPUTER NETWORKS

[75] Inventor: Franz Strohmer, Erlangen, Germany

[73] Assignee: Siemens Aktiengesellschaft, Munich, Germany

[21] Appl. No.: 488,465

[22] Filed: Jun. 7, 1995

Related U.S. Application Data

[63] Continuation of Ser. No. 991,681, Dec. 16, 1992.

[30] Foreign Application Priority Data

Dec. 18, 1991 [EP] European Pat. Off. ............. 91121712

[51] Int. Cl.⁶ .................................................. G06F 1/04
[52] U.S. Cl. .................. 395/559; 364/228.3; 364/228.7; 364/228.8; 364/271; 364/271.2; 364/DIG. 1
[58] Field of Search ...................... 375/107; 340/825.14; 370/100.1, 107; 364/200; 331/1 A; 395/550

[56] References Cited

U.S. PATENT DOCUMENTS

| | | | |
|---|---|---|---|
| 4,531,185 | 7/1985 | Halpern et al. | 364/200 |
| 4,584,643 | 4/1986 | Halpern et al. | 364/200 |
| 4,746,920 | 5/1988 | Nellen et al. | 340/825.14 |
| 4,816,989 | 3/1989 | Finn et al. | 364/200 |
| 5,001,730 | 3/1991 | Franszek et al. | 375/107 |
| 5,041,798 | 8/1991 | Moorman et al. | 331/1 A |
| 5,041,966 | 8/1991 | Nakai et al. | 364/200 |
| 5,062,124 | 10/1991 | Hayashi et al. | 375/107 |
| 5,068,877 | 11/1991 | Near et al. | 375/107 |
| 5,241,543 | 8/1993 | Amada et al. | 370/100.1 |

FOREIGN PATENT DOCUMENTS

0327083  8/1989  European Pat. Off. .

OTHER PUBLICATIONS

IEEE Transactions on Software Engineering, vol. 16, No. 2, Feb. 1990, New York, US, pp. 197–211; Dieter Haban et al.: A Hybrid Monitor for Behavior and Performance Analysis of Distributed Systems.

*Primary Examiner*—Kevin A. Kriess
*Assistant Examiner*—Majid A. Banankhah
*Attorney, Agent, or Firm*—Kenyon & Kenyon

[57] ABSTRACT

A method for controlling clocks in computer networks of a hierarchical structure includes the continual synchronization of the clock modules provided in the individual network levels to the time of a central master clock by means of messages. Time stamps are output from each clock module. Besides a time-of-day field and a date field, these time stamps contain additional information fields relating to synchronization source, synchronization type, synchronization delay, and time-of-day resolution.

24 Claims, 3 Drawing Sheets

METHOD FOR MONITORING THE SYNCHRONIZATION OF CLOCKS IN COMPUTER NETWORKS

This application is a continuation of application Ser. No. 07/991,681, filed Dec. 16, 1992.

BACKGROUND OF THE INVENTION

The present invention relates to a method for controlling clocks in computer networks of a hierarchical structure.

U.S. Pat. No. 4,584,643 describes a method for implementing a fault-tolerant clock control in distributed systems. All of the existing clocks in the network participate in establishing the system time: the mean value is generated from all their clock messages. This generally leads to a considerable amount of messages and places considerable demands on the communication means. There is a need for a system in a hierarchical computer network that can synchronize all of the individual computer clocks to a central control as well as identify when one of the clocks is out of synchronization.

SUMMARY OF THE INVENTION

These and other needs are satisfied by the method of the present invention. While the invention places moderate demands on the communication means given a system-wide clock control, it specifies a method which makes it possible to recognize the occurrence of various time bases in the system. This avoids the faulty linking of inconsistent clock messages.

In one embodiment, a central clock HU provides the time base for the synchronization messages that are sent to the master clock modules in the first level of the hierarchical computer network. These master clock modules send the synchronization message to the slaves and master clock modules in the level below. Each clock module forms a representation of its local time in the form of a time stamp, which contains information regarding time, date, whether it is slaved to a master (F0), which master it is slaved to (CLOCKNR), and if its master is synchronized to HU (F1). It further contains information on the largest variation in time between the clocks in its level (synchronization delay) and the resolution of its own clock (time-of-day resolution). This time stamp information is sent to a central evaluation unit AW for analysis.

The synchronization messages sent from the central clock HU to the master clock modules contain information fields virtually identical to those of the above described time stamps. Each clock module merely retrieves the fields corresponding to F0, CLOCKNR, F1, and places them into the appropriate fields of its time stamp and synchronization messages. The value inserted in the synchronization delay field is the sum of the synchronization delay in the levels above it and the synchronization delay inherent in its own level. The new synchronization message then is sent to the level of clock modules below, while the time stamp message is sent to the central evaluation unit AW.

The synchronization messages and time stamps described above further include a field representing the frequency with which the synchronization messages and time stamps are sent out of the clock module.

Information gathered from the method of the above embodiment is used to determine a minimum time interval in which events can be resolved. Two time stamps are compared to ensure they correspond to synchronized clock modules. If the clock modules are not synchronized the results are rejected as being incomparable due to inconsistent time bases. If the clock modules are synchronized, the sum, for each time stamp, is formed of the synchronization delay field and the time-of-day resolution field. The larger of the two sums is defined as the minimum time interval that two events can be resolved, hereafter denoted event resolution EA.

DETAILED DESCRIPTION

Figure 1:
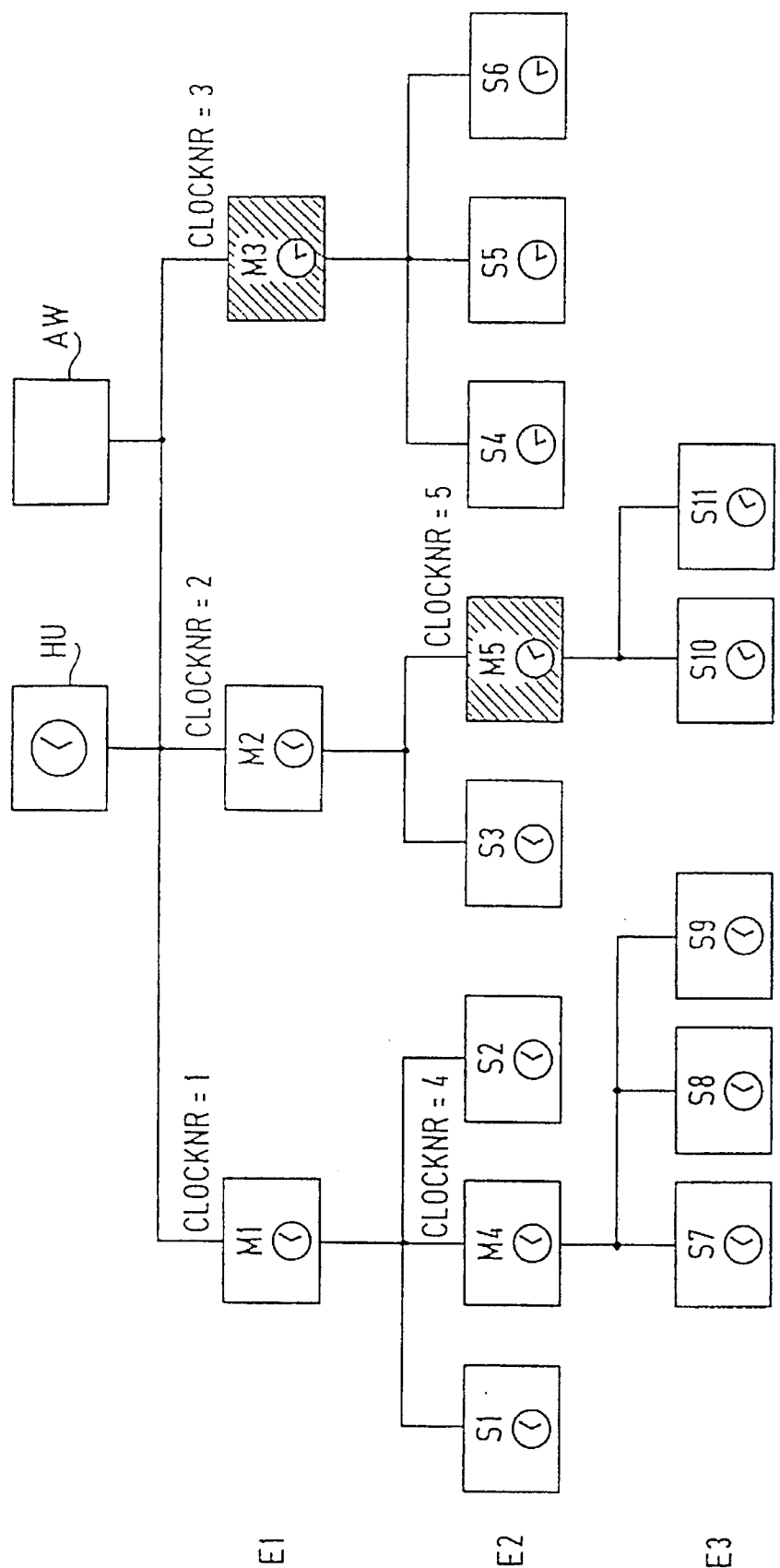
FIG. 1 illustrates an exemplary network configuration, in which an embodiment of the invention is employed.

FIG. 1 depicts a multi-microcomputer system having three hierarchically structured network levels E1 through E3, of which level E1 is the highest in the hierarchy. Clock modules provided in the individual computers—indicated by a clock symbol—are each synchronized by a clock module of the next higher level. A central master clock HU directly synchronizes the clock modules of level E1 and thus determines the time of day for the entire system. A master clock module is one that synchronizes the clock modules of the level beneath it. Each synchronized clock module which itself does not synchronize any clock modules of a level beneath it is called a slave. Masters M1 through M5 with their network-wide identifiers (CLOCKNR) and slaves S1 through S11 are present in the illustrated example.

A central evaluation unit AW is also provided. In this unit, the time stamps which are output by the clock modules are: registered, tested for time consistency, and the events which trigger them are ordered as a function of time (event ordering).

Assume that masters M3 and M5 are temporarily not synchronized with the master clock HU. This could be caused by a lack of synchronization messages or by the restarting of their computer. Then the master clock modules M3 and M5 would be free-running, with the result that their times of day are no longer consistent with those of the remaining system. They thus establish separate time bases.

The following synchronization parameters apply for the three network levels:

|  | E1 | E2 | E3 |
| --- | --- | --- | --- |
| Synchronization cycle [sec] | 60 | 10 | 1 |
| Clock resolution [msec] | 10 | 10 | 1 |
| Synchronization delay [msec] | 1.2 | 0.5 | 0.2 |

The synchronization cycle is the time interval between the synchronization or clock messages; the clock resolution is the externally observable time raster step with which the clock module counts time; and the synchronization delay is the maximum asynchronism that can occur within a hierarchical level between two clock modules. The synchronization delay is essentially determined by the product of the synchronization cycle and the quartz tolerance of the clock module.

Figure 2:
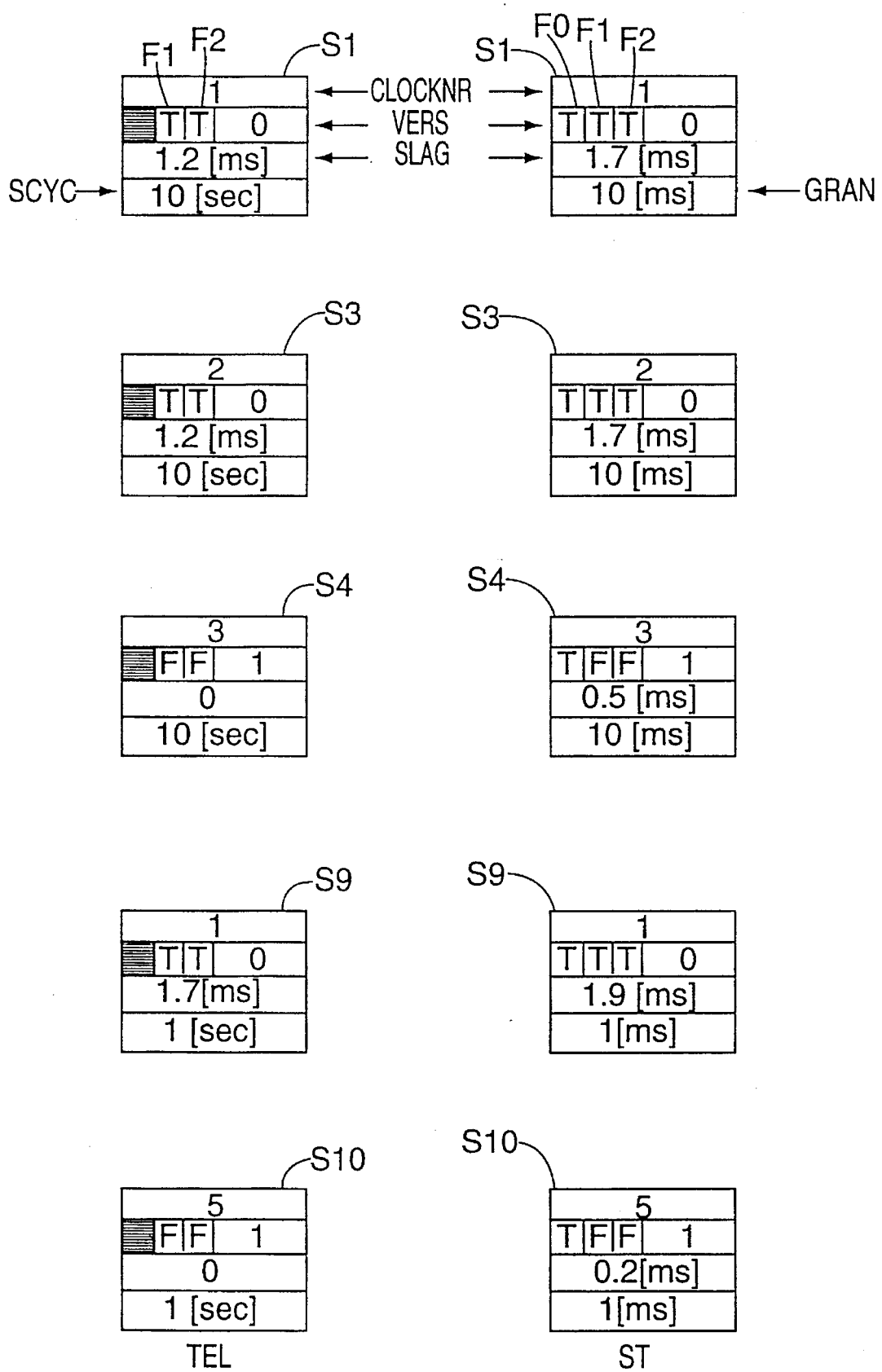
FIG. 2 illustrates the received synchronization messages and the output time stamps for several clock modules of the configuration of FIG. 1, according to an embodiment of the present invention.

With respect to the slave clock modules S1, S3, S4, S9 and S10, for the above described scenario, FIG. 2 shows the contents of the additional information fields. The left column, denoted by TEL, portrays the information fields of the synchronization messages received from these clock modules. The right column, denoted by ST, portrays the information fields of the time stamps output by these clock modules. One should think of the messages as well as the output time stamps as being supplemented by corresponding fields for time of day and date. These are not shown, however, for the sake of clarity.

The synchronization source field, described as CLOCKNR, contains information about the synchronization source, i.e., the identifier of the particular master from where the received message originated. Therefore, it is always the identifier of the highest synchronized master. Thus the CLOCKNR field of slave S9 is CLOCKNR=1 rather than CLOCKNR=4. If a master clock module is unsynchronized, or if it is free-running, then its slaved clock modules are synchronized to it but not to HU. Thus their CLOCKNR fields display the unsynchronized master's CLOCKNR, and not necessarily that of the master in the highest (El) level. As such the CLOCKNR field of slave S10 is CLOCKNR=5 rather than CLOCKNR=2. The field characterized by CLOCKNR always contains the identifier of the highest prior synchronization source.

The synchronization type field, designated as VERS, has three subfields for the synchronization message and four subfields for the time stamps output. The subfield denoted by F1 is characterized by T (=true) if the synchronizing master clock module is synchronized to the central master clock HU. It is set to the value F (=false) if it is "free-running" with its own time base.

When the subfield F1 is set to the value T, F2 signifies whether the master clock HU outputs daylight savings time (T) or standard time (F). In the case that F1=F is entered, the VERS field's far right subfield characterizes the current number of the active free-running phase of the master. This is the third subfield in the case of the synchronization message, and the fourth subfield in the case of the time-of-day stamp. Its contents indicate how many times the master synchronizing this slave was already forced to autonomously determine the time of day of the clock modules arranged downstream from it. This may occur because of a wanted or unwanted uncoupling from the master clock due to failure, for example, of the synchronization messages or other malfunctions. In this case, it broadcasts the synchronization messages to its subordinate hierarchical levels and enters its own identifier in the CLOCKNR field. In the scenario described, the third subfield of the VERS field of the slave clock modules S4 and S10 show that the master clock modules M3 or M5 (which synchronize them) have shifted into a free-running phase. Therefore, the number contained in the fourth subfield of the VERS field can be interpreted as the current number of a newly established time base, which relates to the particular higher-ranking synchronizing master.

The subfield denoted by F0 is an extension of the VERS field for the time stamp. Each clock module sets this subfield to the value T (true), when it is synchronized to a higher-ranking master clock module.

Of particular importance is the synchronization delay field denoted by SLAG, which indicates the synchronization delay. Each master clock module adds the synchronization delay that is relevant for its hierarchical level to the synchronization delay broadcasted to it in the synchronization message. Thus, the values of the synchronization delay in the individual hierarchical levels accumulate in this field. Thus, the SLAG field of the message received from the slave clock module S1 reveals the value of 1.2 msec, while the SLAG field of the message received from the slave clock module S9 shows the value of 1.7 msec, in accordance with the sum of the synchronization delay (1.2 msec) existing in the level E1 and the synchronization delay (0.5 msec) inherent in level E2. The value of the SLAG field in the time stamp is calculated by each clock module from the sum of the SLAG field in the message that it has received and of the value of the synchronization delay that is inherent for its hierarchical level. This becomes clear from a comparison of the SLAG fields from the received message and from the time stamps output for the individual slaves.

In the field denoted by SCYC, the messages intended for the clock modules show the time interval in which the synchronization messages are sent (synchronization cycle). This value is important for the clock module's calculation of the synchronization delay. It is also used to check (in the clock module) the synchronization and regularity of the received messages. Using this, it is possible to recognize when a master clock module has failed.

Finally, in the field denoted by GRAN, the time-of-day resolution is entered. The sum of the value input in this field and the accumulated synchronization delay input (in the SLAG field) determine the event resolution of one clock module. In this context, event resolution is understood to be the minimum interval that two time stamps must be separated for the events characterized by them to be brought into a clear time sequence, in the sense of which event occurred first in time. Characterized in this manner, the event resolution is also the maximum differential error which can occur when time intervals are calculated between two time stamps.

Figure 3:
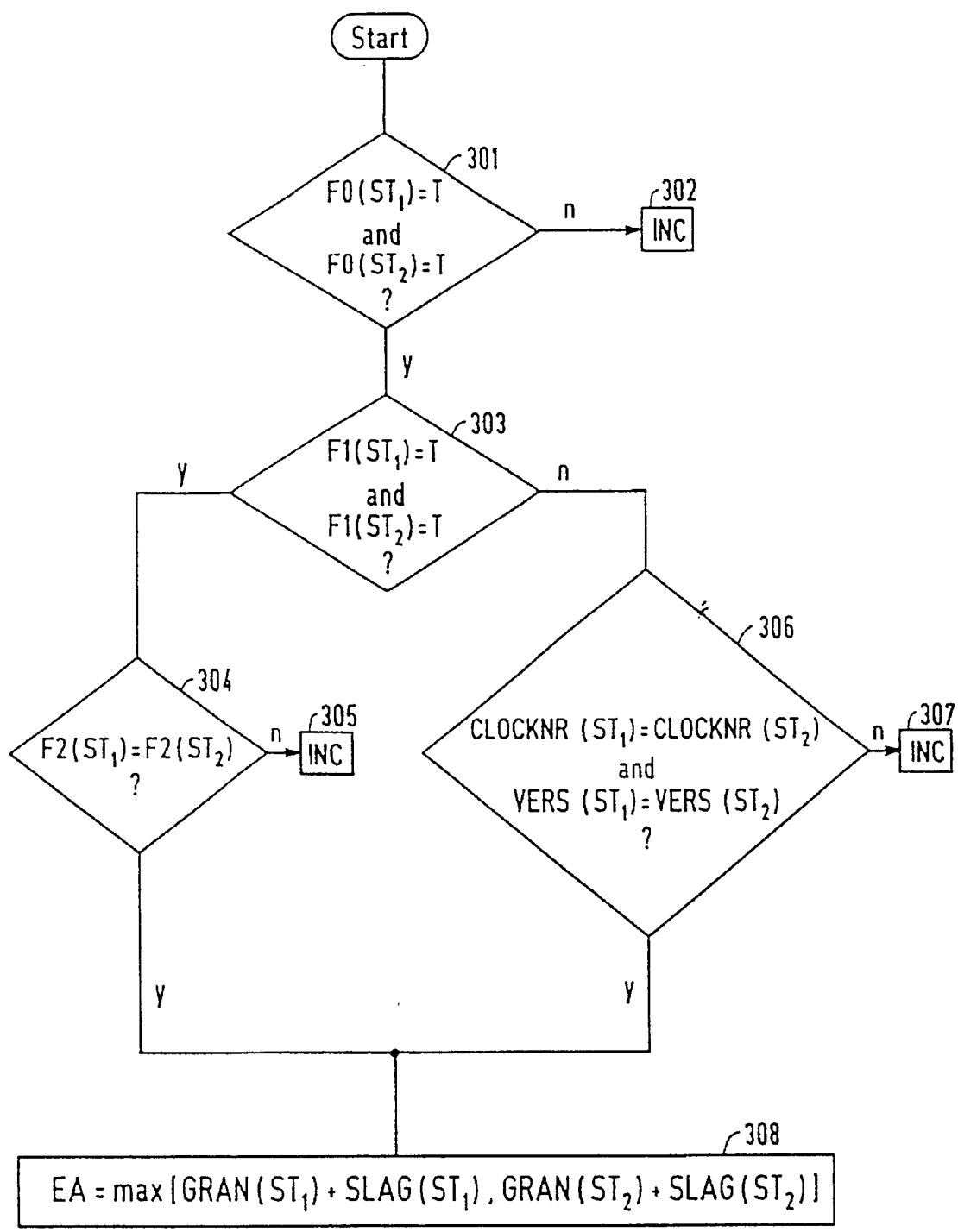
FIG. 3 is a flow chart for evaluating the time stamps of two clock modules.

Using a flow chart, FIG. 3 shows how the additional information of a first and second time stamp, ST1 and ST2, from different clock modules is used for a consistency check and for a subsequent determination of the event resolution in this synchronization scheme. First, it is checked whether the subfields F0 of the two time stamps are set to the value T (301). If they are not, the two time stamps are rejected as being inconsistent, and the error message INC is output (302). This is because no statement can be made on the basis of different time bases about which time stamp characterizes the earlier or the later event. Then, it is checked if the subfields F1 have the value T in both time stamps (303). If so, it is checked to see if the subfields F2 of the two time stamps ST1 and ST2 have the same value (daylight saving time or standard time) (304). If so, the consistency test is successful. If not, the results are rejected as inconsistent (305). If both subfields F1 are not set to the value T, for example, when both clock modules are synchronized to the same free-running master, it is then checked whether the fields CLOCKNR and VERS of the two time stamps conform (306). If not, the two time stamps are again rejected as being inconsistent (307). On the other hand, if they do conform, the event resolution EA of the two time-consistent time stamps is determined (308). This is obtained, in each case, from the larger of the sums of the values in the GRAN and SLAG fields for the two time stamps.

Applying this flow chart to the embodiment of FIG. 2 reveals, that using the method according to the invention, it is possible is conclusively determine time-consistent time stamps and event resolution. A continual synchronization of local clock modules to a central master clock is achieved over several hierarchically structured network levels.

What is claimed is:

1. In a computer network having a hierarchical structure including a central master clock module and a plurality of network levels, in which at least one master clock module synchronizes at least one slave clock module in a level beneath each of said at least one master clock module, a method for determining the presence of unsynchronized clocks and for determining an event resolution between clock modules in the same level within the computer network, comprising the steps of:

(a) forming in each of said master clock modules and each of said slave clock modules of said computer network a time-stamp message, the time-stamp message for a first clock module including:
  (i) a time-of-day field;
  (ii) a date field;
  (iii) a synchronization source field, corresponding to an identifier of the master clock module in said computer network located hierarchically above said first clock module;
  (iv) a synchronization type field, having at least a field corresponding to whether the master clock module identified in (iii) is synchronized to said central master clock module;
  (v) a synchronization delay field, corresponding in part to a largest variation between which two of said clock modules in the computer network level within which is located the first clock module may be separated in time;
  (vi) a time-of-day resolution field, corresponding to the resolution in time of said first clock module;

(b) sending said time-stamp message from said first clock module to a central evaluation unit for monitoring of the synchronization of said clock module with respect to the time of said central master clock module.

2. The method of claim 1, wherein each clock module in said hierarchical structure sends synchronization messages to each clock module in a hierarchically lower-ranking network level, if any, each of said synchronization messages having a plurality of fields corresponding to those in said time-stamp message, said method further comprising the steps of:

(c) receiving in a second clock module a synchronization message from a master clock module in a hierarchically higher-ranking network level, said network level within which is located said second clock module having a known synchronization delay corresponding in part to a largest variation between which two of said clock modules in said computer network level within which said second clock module is located may be separated in time and yet synchronized;

(d) retrieving data into said second clock module from said synchronization message and placing said data into corresponding fields of a time-stamp message;

(e) computing a sum in said second clock module of the value in said a synchronization delay field within said received synchronization message and a synchronization delay corresponding to said network level of said second clock module;

(f) entering said sum into said synchronization delay field of said time-stamp message and said synchronization message; and (g) sending said synchronization message from said second clock module to every other clock module hierarchically located said second clock module.

3. The method of claim 1, wherein said synchronization message and said time-stamp message each further comprise:
  (vii) an information field, corresponding to a synchronization cycle of said clock module or master clock module sending said synchronization message from a higher-ranking level.

4. The method of claim 2, wherein said synchronization message and said time-stamp message each further comprise:
  (vii) an information field, corresponding to a synchronization cycle of said clock module of master clock module sending said synchronization message from a higher-ranking level.

5. The method of claim 1, wherein a minimum event resolution between a third clock module and a fourth clock module is calculated in said central evaluation unit, said method further comprising the steps of:

(aa) comparing the subfield corresponding to 1) whether the third and fourth clock modules are synchronized to a higher clock module; 2) whether the synchronizing master clock module is itself synchronized to the central master clock module; and 3) whether both third and fourth clock module are set to either daylight saving time or standard time; in a time-stamp message from the third clock module and a time-stamp message from the fourth clock module;

(bb) calculating a sum of of a time-of-day resolution and the synchronization delay field in each of said time-stamp messages formed in each of said third and fourth clock modules when data in said subfields in step (aa) is equal; and (cc) selecting larger of said sums calculated in step (bb) and defining said larger sum as said minimum event resolution of the third and fourth clock modules.

6. The method of claim 3, wherein a minimum event resolution between a third clock module and a fourth clock module is calculated in said central evaluation unit, said method further comprising the steps of:

(aa) comparing the subfield corresponding to 1) whether the third and fourth clock modules are synchronized to a higher clock module; 2) whether the synchronizing master clock module is itself synchronized to the central master clock module; and 3) whether both third and fourth clock module are set to either daylight saving time or standard time; in a time-stamp message from the third clock module and a time-stamp message from the fourth clock module;

(bb) calculating a sum of of a time-of-day resolution and the synchronization delay field in each of said time-stamp messages formed in each of said third and fourth clock modules when data in said subfields in step (aa) is equal; and (cc) selecting larger of said sums calculated in step (bb) and defining said larger sum as said minimum event resolution of the third and fourth clock modules.

7. The method of claim 3, wherein a minimum event resolution between a first clock module and a second clock module is calculated in said central evaluation unit, said method further comprising the steps of:

(aa) comparing the subfield corresponding to 1) whether the first and second clock modules are synchronized to a higher clock module; 2) whether the synchronizing master clock is itself synchronized to the central master clock; and 3) whether both clocks are set to either daylight saving time or standard time; in a time-stamp message from the first clock module and a time-stamp message from the second clock module;

(bb) calculating a sum of data of a time-of-day resolution and the synchronization delay field in each of said time-stamp messages formed in each of said first and second clock modules when data in said subfields is equal; and (cc) selecting a larger sum from said sums calculated in step (bb) as said minimum event resolution of the first and second clocks.

8. The method of claim 1, wherein a minimum event resolution between a third clock module and a fourth clock module is calculated in said central evaluation unit, said method further comprising the steps of:

(aa) comparing the subfield corresponding to 1) whether the third and fourth clock modules are synchronized to a higher clock module; 2) whether the synchronizing master clock module is itself synchronized to the central master clock module; and 3) whether both third and fourth clock module are set to either daylight saving time or standard time; in a time-stamp message from the third clock module and a time-stamp message from the fourth clock module;

(bb) calculating a sum of of a time-of-day resolution and the synchronization delay field in each of said time-stamp messages formed in each of said third and fourth clock modules when data in said subfields in step (aa) is equal; and (cc) selecting larger of said sums calculated in step (bb) and defining said larger stun as said minimum event resolution of the third and fourth clock modules.

9. A method for determining the presence of unsynchronized clock modules in computers which are interconnected in a network distributed in hierarchical levels having a central master clock module and containing a plurality of master clock modules and a plurality of slave clock modules comprising the steps of:

a) distributing a plurality of synchronization messages into the network from clock modules in a higher level to clock modules in a lower level to effect a synchronization of said plurality of master clock modules and said plurality of slave clock modules to the time of said central master clock module;

b) delivering a time stamp from each of said plurality of slave clock modules and from each of said plurality of master clocks modules to a central evaluation unit, said plurality of slave and master clock modules having stored information sub fields corresponding to a current value of:
i) date and time of day;
ii) synchronization source;
iii) synchronization type;
iv) synchronization delay; and
v) time-of-day resolution, c) comparing a time stamp supplied by one of said plurality of slave and master clock modules with a time stamp from at least one other of said plurality of slave and master clock modules to determine whether said slave and master clock modules are synchronized.

10. The method according to claim 9 wherein said subfields i)–v) are compared within an evaluation unit to test the synchronization as a function of time of at least two of said time stamps supplied by at least two of said plurality of slave and master clock modules.

11. The method according to claim 10, further comprising the step of:

(d) determining a minimum event resolution of two events corresponding to two of said time stamps supplied by said plurality of slave and master clock modules by calculating the sum for each clock module of said time-of-day resolution and said synchronization delay for each of said time stamps, and determining the greatest of these sums, and defining said greatest sum to be the minimum event resolution.

12. The method according to claim 9 wherein values from said information fields corresponding to said synchronization source and said synchronization type are retrieved from said synchronization message received from said plurality of master clock modules in the network and stored in said information fields corresponding to said synchronization source and said synchronization type, respectively, in said time-stamp message.

13. The method according to claim 9 wherein the sum of said synchronization delay in the network level and the synchronization delay of a respective higher network level is stored in said information field corresponding to said synchronization delay in said time-stamp.

14. The method according to claim 9 wherein said synchronization message has an information field storing a value of a synchronization cycle of said master clock module.

15. In a multi-module network in which the network modules contain clock modules, and in which a central master clock module establishes a reference time for the network, a method for determining the presence of unsynchronized clocks within the network and for determining an event resolution between clocks in the network, comprising the steps of:

(a) forming in the central master clock module a synchronization message, said synchronization message including:
(i) a time-of-day field;
(ii) a date field;
(iii) a time-of-day resolution field, corresponding to the resolution in time of the central master clock module;

(b) sending said synchronization message from the central master clock module to at least one clock module in a first level located hierarchically below said central master clock module; and (c) sending a time stamp message from said at least one clock module in said first level to a central evaluation unit.

16. In a multi-module network in which the network modules contain clock modules, and in which a central master clock module establishes a reference time for the network, a method for determining the presence of unsynchronized clocks within the network and for determining an event resolution between clocks in the network, comprising the steps of:

(a) forming in the central master clock module a synchronization message, said synchronization message including:
(i) a time-of-day field;
(ii) a date field;
(iii) a time-of-day resolution field, corresponding to the resolution in time of the central master clock module;

(b) sending said synchronization message from the central master clock module to at least one clock module in a first level located hierarchically below said central master clock module;

(c) sending a synchronization message from each of said at least one clock modules in said first level to at least one clock module in a second level located hierarchically below said first level, said synchronization message including:
  (i) a time-of-day field;
  (ii) a date field;
  (iii) a time-of-day resolution field, corresponding to the resolution in time of the central master clock module;
  (iv) a synchronization delay field, corresponding in part to a largest variation between which two of said at least one clock modules in said first level may be separated in time and still be deemed synchronized;
  (v) a synchronization source field, corresponding to an identifier of said at least one clock module in said first level located hierarchically above said at least one clock module in said second level;
  (vi) a synchronization type field, having at least a field corresponding to whether the clock module corresponding to the identifier in (v) is synchronized to said central master clock module;
(d) sending a separate time stamp message from each clock having no clock modules hierarchically below it in said first and second levels to said central evaluation unit, said time stamp message having fields (i)–(vi); and
(e) analyzing within said central evaluation unit all received time stamp messages to determine the presence of unsynchronized clock modules by noting inconsistencies in time measurement reported by said time stamps.

17. In a multi-module network in which the network modules contain clock modules, and in which a central master clock module establishes a reference time for the network, a method for determining the presence of unsynchronized clocks within the network and for determining an event resolution between clocks in the network, comprising the steps of:
(a) forming in the central master clock module a synchronization message, said synchronization message including:
  (i) a time-of-day field;
  (ii) a date field;
  (iii) a time-of-day resolution field, corresponding to the resolution in time of the central master clock module;
(b) sending said synchronization message from the central master clock module to at least one clock module in a first level located hierarchically below said central master clock module;
(c) sending a synchronization message from each of said at least one clock modules in said first level to at least one clock module in a second level located hierarchically below said first level, said synchronization message including:
  (i) a time-of-day field;
  (ii) a date field;
  (iii) a time-of-day resolution field, corresponding to the :resolution in time of the central master clock module;
  (iv) a synchronization delay field, corresponding in part to a largest variation between which two of said at least one clock modules in said first level may be separated in time and still be deemed synchronized;
  (v) a synchronization source field, corresponding to an identifier of said at least one clock module in said first level located hierarchically above said at least one clock module in said second level;
  (vi) a synchronization type field, having at least a field corresponding to whether the clock module corresponding to the identifier in (v) is synchronized to said central master clock module;
(d) sending a synchronization message from each of said at least one clock modules in said second level to at least one clock module in a third level located hierarchically below said second level, said synchronization messages including (i)–(vi);
(e) sending a separate time stamp message from each clock having no clock modules hierarchically below it in said first and second and third levels to said central evaluation unit, said time stamp message having fields (i)–(vi); and
(f) analyzing within said central evaluation unit all received time stamp messages to determine the presence of unsynchronized clock modules by noting inconsistencies in time measurement reported by said time stamps.

18. In a multi-module network in which the network modules contain clock modules, and in which a central master clock module establishes a reference time for the network, a method for determining the presence of unsynchronized clocks within the network and for determining an event resolution between clocks in the network, comprising the steps of:
(a) forming in the central master clock module a synchronization message, said synchronization message including:
  (i) a time-of-day field;
  (ii) a date field;
  (iii) a time-of-day resolution field, corresponding to the resolution in time of the central master clock module;
(b) sending said synchronization message from the central master clock module to at least one clock module in a first level located hierarchically below said central master clock module;
(c) sending a synchronization message from each of said at least one clock modules in said first level to at least one clock module in a second level located hierarchically below said first level, said synchronization message including:
  (i) a time-of-day field;
  (ii) a date field;
  (iii) a time-of-day resolution field, corresponding to the resolution in time of the central master clock module;
  (iv) a synchronization delay field, corresponding in part to a largest variation between which two of said at least one clock modules in said first level may be separated in time and still be deemed synchronized;
  (v) a synchronization source field, corresponding to an identifier of said at least one clock module in said first level located hierarchically above said at least one clock module in said second level;
  (vi) a synchronization type field, having at least a field corresponding to whether the clock module corresponding to the identifier in (v) is synchronized to said central master clock module;
(d) sending a synchronization message from each of said at least one clock modules in said second level to at least one clock module in a third level located hierarchically below said second level, said synchronization message including (i)–(vi);

(e) sending a synchronization message from each of said at least one clock modules in said third level to at least one clock module in a fourth level located hierarchically below said third level, said synchronization message including (i)–(vi);

(f) sending a time stamp message from each clock having no clock modules hierarchically below it in said first and second and third and fourth levels to said central evaluation unit, said time stamp message having fields (i)–(vi); and (g) analyzing within said central evaluation unit all received time stamp messages to determine the presence of unsynchronized clock modules.

19. The method of claim 16, further comprising the steps of:

(a) calculating an event resolution between two events having two time stamps by determining, for each of the two time stamps, the sum of the time of day resolution and the synchronization delay, and choosing the sum having the greatest absolute value.

20. The method of claim 17, further comprising the steps of:

(a) calculating an event resolution between two events having two time stamps by determining, for each of the two time stamps, the sum of the time of day resolution and the synchronization delay, and choosing the sum having the greatest absolute value.

21. The method of claim 18, further comprising the steps of:

(a) calculating an event resolution between two events having two time stamps by determining, for each of the two time stamps, the sum of the time of day resolution and the synchronization delay, and choosing the sum having the greatest absolute value.

22. The method of claim 16, wherein said fields corresponding to synchronization source and synchronization type in said time stamp sent in step (d) are retrieved from corresponding fields in the synchronization message sent in steps (b) and (c).

23. The method of claim 17, wherein said fields corresponding to synchronization source and synchronization type in said time stamp sent in step (e) are retrieved from corresponding fields in the synchronization message sent in steps (b) and (c) and (d).

24. The method of claim 18, wherein said fields corresponding to synchronization source and synchronization type in said time stamp sent in step (f) are retrieved from corresponding fields in the synchronization message sent in steps (b)–(e).

* * * * *